(12) United States Patent
Oyama et al.

(10) Patent No.: US 10,709,990 B2
(45) Date of Patent: Jul. 14, 2020

(54) INFORMATION PROCESSOR, RECORDING MEDIUM, AND GAME CONTROL METHOD

(71) Applicant: Universal Entertainment Corporation, Koto-Ku, Tokyo (JP)

(72) Inventors: Masaki Oyama, Tokyo (JP); Atsushi Kumita, Tokyo (JP); Toshikazu Jinnouchi, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 0 days.

(21) Appl. No.: 16/134,065

(22) Filed: Sep. 18, 2018

(65) Prior Publication Data

US 2019/0083889 A1 Mar. 21, 2019

(30) Foreign Application Priority Data

Sep. 21, 2017 (JP) ................................ 2017-181743

(51) Int. Cl.
*A63F 13/798* (2014.01)
*G07F 17/32* (2006.01)
*A63F 13/25* (2014.01)

(52) U.S. Cl.
CPC ............ *A63F 13/798* (2014.09); *A63F 13/25* (2014.09); *G07F 17/323* (2013.01); *G07F 17/3209* (2013.01)

(58) Field of Classification Search
CPC .... A63F 13/798; A63F 13/25; G07F 17/3209; G07F 17/323
See application file for complete search history.

(56) References Cited

U.S. PATENT DOCUMENTS

2010/0120503 A1* 5/2010 Hoffman ............. G07F 17/3272
463/20

FOREIGN PATENT DOCUMENTS

WO 2016136749 A1 9/2016

* cited by examiner

*Primary Examiner* — Werner G Garner
(74) *Attorney, Agent, or Firm* — Potomac Law Group, PLLC; Kenneth Fagin

(57) ABSTRACT

An information processor for executing a game comprises an input unit for operating the game, a memory for storing a counter area for digitizing and counting information which increases as the game is executed and a numerical value game rank correspondence table in which a plurality of numerical value ranges and a plurality of game ranks are associated, and a controller programmed to perform the following processes. (1a) a process of executing a game by operations of an input unit, (1b) a process of digitizing and counting information which increases as the game is executed in the counter area, (1c) a process of determining the game rank corresponding to the numerical value counted in the counter area on the basis of the numerical value counted in the counter area and the numerical value game rank correspondence table, (1d) a process of giving a benefit according to the game rank.

7 Claims, 14 Drawing Sheets

FIG.5

SYMBOL COLUMNS OF VIDEO REELS

|    | REEL 1     | REEL 2     | REEL 3     | REEL 4     | REEL 5     |
|----|------------|------------|------------|------------|------------|
| 0  | BELL       | 9          | CHERRY     | 9          | 7          |
| 1  | ACE        | JACK       | KING       | JACK       | ACE        |
| 2  | 7          | WILD       | 9          | WILD       | BELL       |
| 3  | JACK       | 9          | ACE        | 9          | KING       |
| 4  | KING       | 10         | BELL       | JACK       | WATERMELON |
| 5  | WATERMELON | 7          | 10         | HEART      | ACE        |
| 6  | 10         | ACE        | WATERMELON | KING       | QUEEN      |
| 7  | HEART      | BELL       | JACK       | BELL       | HEART      |
| 8  | JACK       | JACK       | CHERRY     | 10         | JACK       |
| 9  | 9          | WATERMELON | 10         | 7          | 9          |
| 10 | CHERRY     | 9          | WATERMELON | 9          | CHERRY     |
| 11 | JACK       | CHERRY     | KING       | CHERRY     | 10         |
| 12 | ACE        | ACE        | 10         | ACE        | KING       |
| 13 | BELL       | QUEEN      | HEART      | 9          | WATERMELON |
| 14 | KING       | 9          | QUEEN      | QUEEN      | JACK       |
| 15 | QUEEN      | KING       | 9          | BELL       | 9          |
| 16 | HEART      | HEART      | 7          | 10         | 9          |
| 17 | JACK       | ACE        | QUEEN      | HEART      | QUEEN      |
| 18 | 10         | QUEEN      | 10         | ACE        | ACE        |
| 19 | 9          | WATERMELON | WILD       | KING       | BELL       |
| 20 | 9          | 10         | QUEEN      | WATERMELON | JACK       |
| 21 | CHERRY     | 9          | 10         | ACE        | ACE        |
| 22 | JACK       | QUEEN      | CHERRY     | JACK       | 9          |
| 23 | 10         | CHERRY     | ACE        | 9          | WATERMELON |
| 24 | WATERMELON | 9          | QUEEN      | 10         | 10         |
| 25 | JACK       | KING       | QUEEN      | CHERRY     | ACE        |
| 26 |            | 7          | BELL       | KING       | CHERRY     |
| 27 |            | 10         | 9          |            | QUEEN      |
| 28 |            | BELL       |            |            | ACE        |
| 29 |            |            |            |            | HEART      |
| 30 |            |            |            |            | 10         |
| 31 |            |            |            |            | BELL       |
| 32 |            |            |            |            | ACE        |
| 33 |            |            |            |            | KING       |
| 34 |            |            |            |            |            |

FIG.6

SYMBOL COMBINATION TABLE OF FIRST SLOT GAME

| SYMBOL | GRAPHICS | 1 | 2 | 3 | 4 | 5 |
|---|---|---|---|---|---|---|
| WILD | | 0 | 0 | 0 | 0 | 0 |
| 7 | | 0 | 0 | 50 | 300 | 1000 |
| HEART | | 0 | 0 | 35 | 200 | 800 |
| BELL | | 0 | 0 | 30 | 100 | 500 |
| WATERMELON | | 0 | 0 | 20 | 50 | 300 |
| CHERRY | | 0 | 0 | 15 | 35 | 300 |
| ACE | A | 0 | 0 | 10 | 30 | 200 |
| KING | K | 0 | 0 | 10 | 20 | 200 |
| QUEEN | Q | 0 | 0 | 10 | 15 | 100 |
| JACK | J | 0 | 0 | 10 | 15 | 100 |
| TEN | 10 | 0 | 0 | 5 | 15 | 100 |
| NINE | 9 | 0 | 0 | 5 | 10 | 100 |

FIG.7

GAME RANK CORRESPONDENCE TABLE

| GAME RANK | NUMERICAL VALUE RANGE OF POINT | ALLEVIATION RATE OF QUEST |
|---|---|---|
| G | 10,000~19,999 | 2% |
| F | 20,000~39,999 | 4% |
| E | 40,000~99,999 | 6% |
| D | 100,000~149,999 | 8% |
| C | 150,000~199,999 | 10% |
| B | 200,000~299,999 | 12% |
| A | 300,000~499,999 | 14% |
| S | 500,000~999,999 | 16% |
| SS | 1,000,000~1,999,999 | 18% |
| SSS | 2,000,000~ | 20% |

INFORMATION PROCESSOR, RECORDING MEDIUM, AND GAME CONTROL METHOD

CROSS-REFERENCE TO RELATED APPLICATION

This Application is Entitled to the benefit of Japanese Pat. App. No. 2017-181743, filed on Sep. 21, 2017.

BACKGROUND OF THE INVENTION

1. Field of Invention

The present invention relates to an information processor, recording medium, and a game control method.

2. Description of Related Art

In the related art, there are various types of games to be performed by a home type game console device, a game device installed in a facility, or an information processor such as a smart phone. For example, there are a slot game in which the slot game is played by betting various gaming mediums (currency in a game or the like) and a slot game in which a benefit (payout) is given based on a the gaming mediums and a combination of symbols (game result) displayed on a screen. In such a game, it is based on enjoying by repeating a game of one cycle from the start of the game until obtaining the game result (see Patent Document 1).

PRIOR ART DOCUMENT

Patent Document

Patent Document 1: International Publication No. WO2016/136749A1

In such a game, it is easy for the game to become monotonous, and Also, since it is assumed that a game of a relatively short time (several hours) will be played for an unspecified majority, it is not assumed that a specific individual will perform the same game over a long period of time.

Therefore, it is an object of the present invention to provide an information processor, a game program, and a game control method capable of improving the monotony of the game and inducing a specific game to be continued.

SUMMARY OF THE INVENTION

The present invention relates to an information processor for executing a game, comprising: an input unit for operating the game, a memory for storing a counter area for digitizing and counting information which increases as the game is executed and a numerical value game rank correspondence table in which a plurality of numerical value ranges and a plurality of game ranks are associated, and a controller programmed to execute:
(1a) a process of executing the game by operations of the input unit,
(1b) a process of digitizing and counting information which increases as the game is executed in the counter area,
(1c) a process of determining the game rank corresponding to the numerical value counted in the counter area on the basis of the numerical value counted in the counter area and the numerical value game rank correspondence table, and
(1d) a process of giving a benefit according to the game rank.

When the game is executed, information increasing with the result or the like of the game is digitized, and a benefit corresponding to the counted numerical value is given. According to this, if the game is continuously executed, a content of the benefit to be given also changes, so that it is possible to improve the monotony with respect to the manner of giving the benefit.

In addition, for a player, since the benefit given by the continuation of the game changes, there is also a high possibility that it is possible to attract attention to the game and induce the player to continue the game.

Further, the present invention provides the above information processor in which a plurality of types of games are executed, a conversion rate for converting the information into a numerical value is set according to the plurality of types of games.

According to the above configuration, even if the information accompanying the execution of the game is the same, the conversion rate for digitizing the information can be made different depending on the types of the executed games. As a result, the numerical value to be counted can also be changed depending on the type of the game, so that the monotony with respect to the manner of giving the numerical value to be counted can be improved.

In addition, for a player, since the conversion rate when digitizing the information varies depending on the type of game to be executed, there is a high possibility that it is possible to induce the play to execute a game with a high conversion rate.

In addition, in the information processor of the present invention, a quest accompanying the game and cleared by satisfying a predetermined condition is executed, the benefit given in the (1d) is to relax the predetermined condition for clearing the quest according to the game rank.

According to the above configuration, it is possible to relax the predetermined condition for clearing the quest by continuing the game, thereby improving the monotony with respect to the manner of clearing the quest.

In addition, there is also a high possibility that it is possible to induce the player to execute the quest by continuing the game.

Further, in the information processor of the present invention, the information which increases as the game is executed is the number of executions of the game.

According to the above configuration, since the content of the benefit to be given by the number of executions of the game also changes, it is possible to improve the monotony with respect to the manner of giving the benefit.

In addition, for a player, since the benefit given according to the number of executions of the game changes, there is also a high possibility that it is possible to attract attention to the game and induce the player to continue the game.

In addition, the present invention provides a game control method comprising the steps of:
(1a) executing the game by operations of an input unit,
(1b) digitizing and counting information which increases as the game is executed in a counter area of a memory,
(1c) determining the game rank corresponding to the numerical value counted in the counter area on the basis of the numerical value counted in the counter area and a numerical value game rank correspondence table, in which a plurality of numerical value ranges and a plurality of game ranks are associated, stored in the memory, and
(1d) giving a benefit according to the game rank.

When the game is executed, information increasing with the result or the like of the game is digitized, and a benefit corresponding to the counted numerical value is given.

According to this, if the game is continuously executed, a content of the benefit to be given also changes, so that it is possible to improve the monotony with respect to the manner of giving the benefit.

In addition, for a player, since the benefit given by the continuation of the game changes, there is also a high possibility that it is possible to attract attention to the game and induce the player to continue the game.

In addition, the present invention provides a non-transitory computer-readable medium storing a game program executed by a computer of an information processor, the computer being controlled to perform:

a process of executing a game by operations of an input unit,
a process of digitizing and counting information which increases as the game is executed in a counter area of a memory,
a process of determining the game rank corresponding to the numerical value counted in the counter area on the basis of the numerical value counted in the counter area and a numerical value game rank correspondence table, in which a plurality of numerical value ranges and a plurality of game ranks are associated, stored in the memory, and
a process of giving a benefit according to the game rank.

When the game program is executed, information increasing with the result or the like of the game is digitized, and a benefit corresponding to the counted numerical value is given. According to this, if the game is continuously executed, a content of the benefit to be given also changes, so that it is possible to improve the monotony with respect to the manner of giving the benefit.

In addition, for a player, since the benefit given by the continuation of the game changes, there is also a high possibility that it is possible to attract attention to the game and induce the player to continue the game.

The present invention can provide an information processor, a game program, and a game control method capable of improving the monotony of the game and inducing a specific game to be continued.

BRIEF DESCRIPTION OF THE DRAWINGS

FIG. 5 is an illustrative view of symbol columns of video reels of the first slot game.

FIG. 6 is an illustrative view of a symbol combination table of the first slot game.

FIG. 7 is an illustrative view of a game rank correspondence table.

DESCRIPTION OF THE PREFERRED EMBODIMENTS

Embodiments

The information processor of the present invention will be described based on the drawings.

The game executed in the present embodiment can be executed as application software (program, game data) by being installed in a information processor such as a smart phone, a portable computer, a laptop computer, a notebook computer, a tablet type personal computer, a handheld type personal computer, and a PDA (Personal Data Assistant). The application software for executing this game is downloaded from a server (not shown) or the like by communication means and stored in a storage device in the information processor. Wherein, the communication means may be a bidirectional communication path such as the Internet or a cable television, or may be a broadcast that transmits information only in one direction.

In addition, the application software for executing the game may also be stored in a recording medium such as a floppy disk, a CD-ROM, a DVD-ROM, an MO (magneto-optical disk), a flash memory or the like, and read out from the recording medium as necessary and then installed in the storage device in the information processor.

In the present embodiment, as the information processor, the smartphone 1 shown in FIG. 1 will be described as an example. In addition, in the following description, the smartphone 1 will be described, but the process and operation of the smartphone 1 can be replaced with the invention of a program or game control method.

(Configuration of Smartphone 1)

Figure 2:
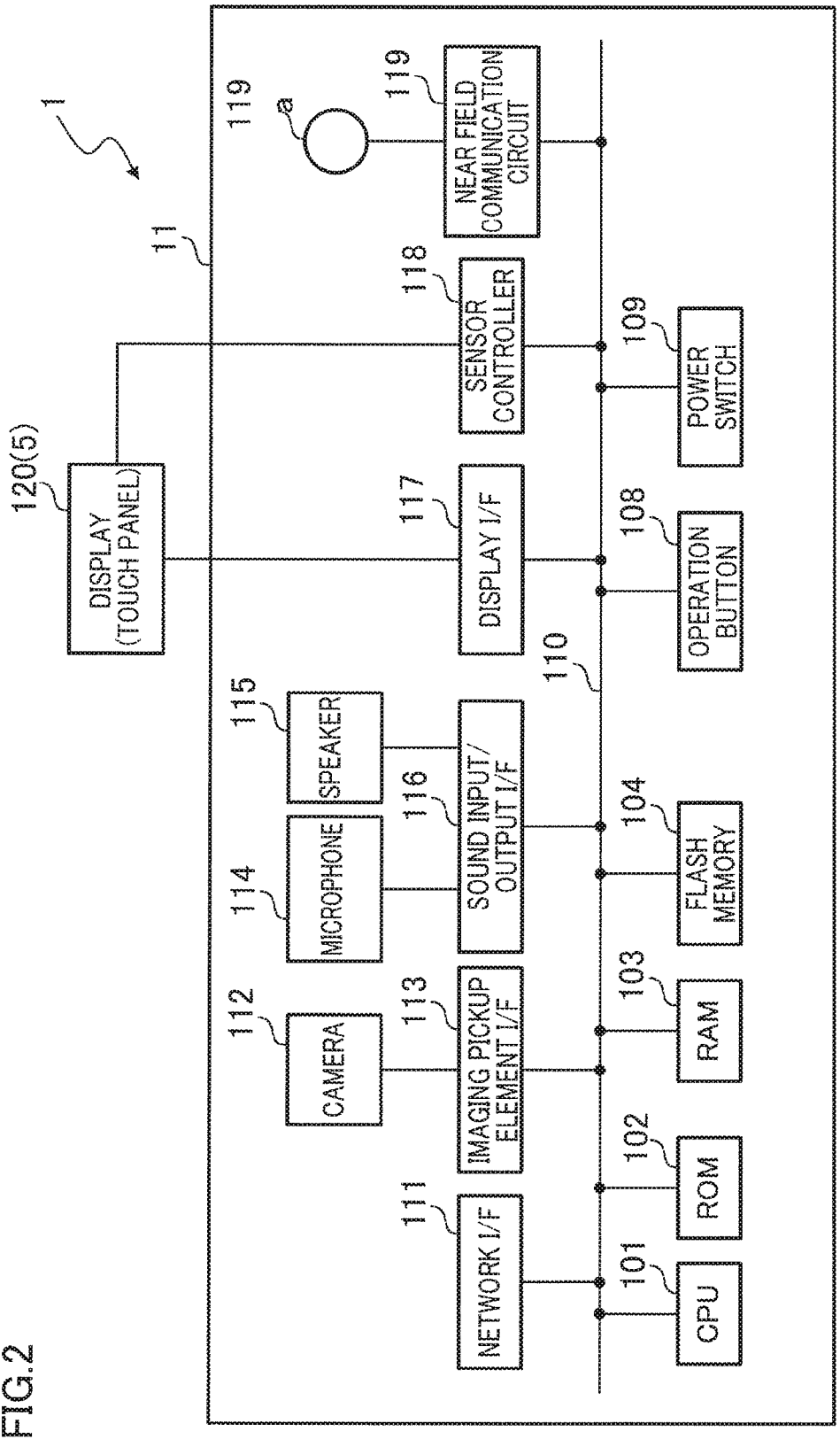
FIG. 2 is a block diagram showing an electric configuration of the smartphone (the information processor).

As shown in FIG. 2, the smartphone 1 includes a CPU 101, a ROM 102, a RAM 103, a flash memory 104, an operation button 108, a power switch 109, a bus line 110, a network I/F 111, a camera 112, an image pickup element I/F 113, a microphone 114, a speaker 115, a sound input/output I/F 116, a display I/F 117, a sensor controller 118, a short-range communication circuit 119, and an antenna 119a of the short-range communication circuit 119 provided in a cabinet 11. In addition, on the front surface of the cabinet 11, the display 120 having a touch panel 5 (input unit) is installed.

The display 120 is configured to display an image. As a display method of the display 120, various display methods such as a liquid crystal method, an organic electroluminescence method, a CRT (Cathode Ray Tube) method, a plasma method and the like are exemplified.

The CPU (Central Processing Unit) 101 controls the overall operation of the smartphone 1. The ROM (Read Only Memory) 102 stores a program used for driving the CPU 101, such as an IPL (Initial Program Loader).

The RAM (Random Access Memory) 103 is used as a work area of the CPU 101. The flash memory 104 stores various kinds of data such as a application software (program), a communication program, an image data, and a sound data for executing the game according to this embodiment (game data necessary for a slot game such a symbol column, a symbol combination table of video reels to be described later). The operation button 108 is a button that is operated when the smartphone 1 is initially set. The power switch 109 is a switch for switching ON/OFF of the power of the smartphone 1.

The network I/F (Interface) 111 is interface for performing a data communication by utilizing a communication network such as the Internet. The camera 112 is a kind of built-in type image pickup unit that captures an image of a subject under the control of the CPU 101 to obtain image data. The image pickup element I/F 113 is a circuit that controls driving of the camera 112. The microphone 114 is a kind of built-in type sound collecting unit for inputting a sound. The sound input/output I/F 116 is a circuit for processing input and output of sound signals between the microphone 114 and between the speaker 115 under the control of the CPU 101. The display I/F 117 is a circuit that transmits image data to the display 120 under the control of the CPU 101. The sensor controller 118 is a circuit that receives an input from the touch panel 5 provided on the display 120. The short-range communication circuit 119 is a communication circuit such as an NFC (Near Field Communication) (registered trademark), a Bluetooth (registered trademark), or the like. The bus line 110 is an address bus, a data bus, or the like for electrically connecting each component such as the CPU 101.

(Overview of Game Executed by Smartphone 1)

In the smartphone 1 having the above configuration, the CPU 101 is programmed to execute the application software of a game.

Figure 11:
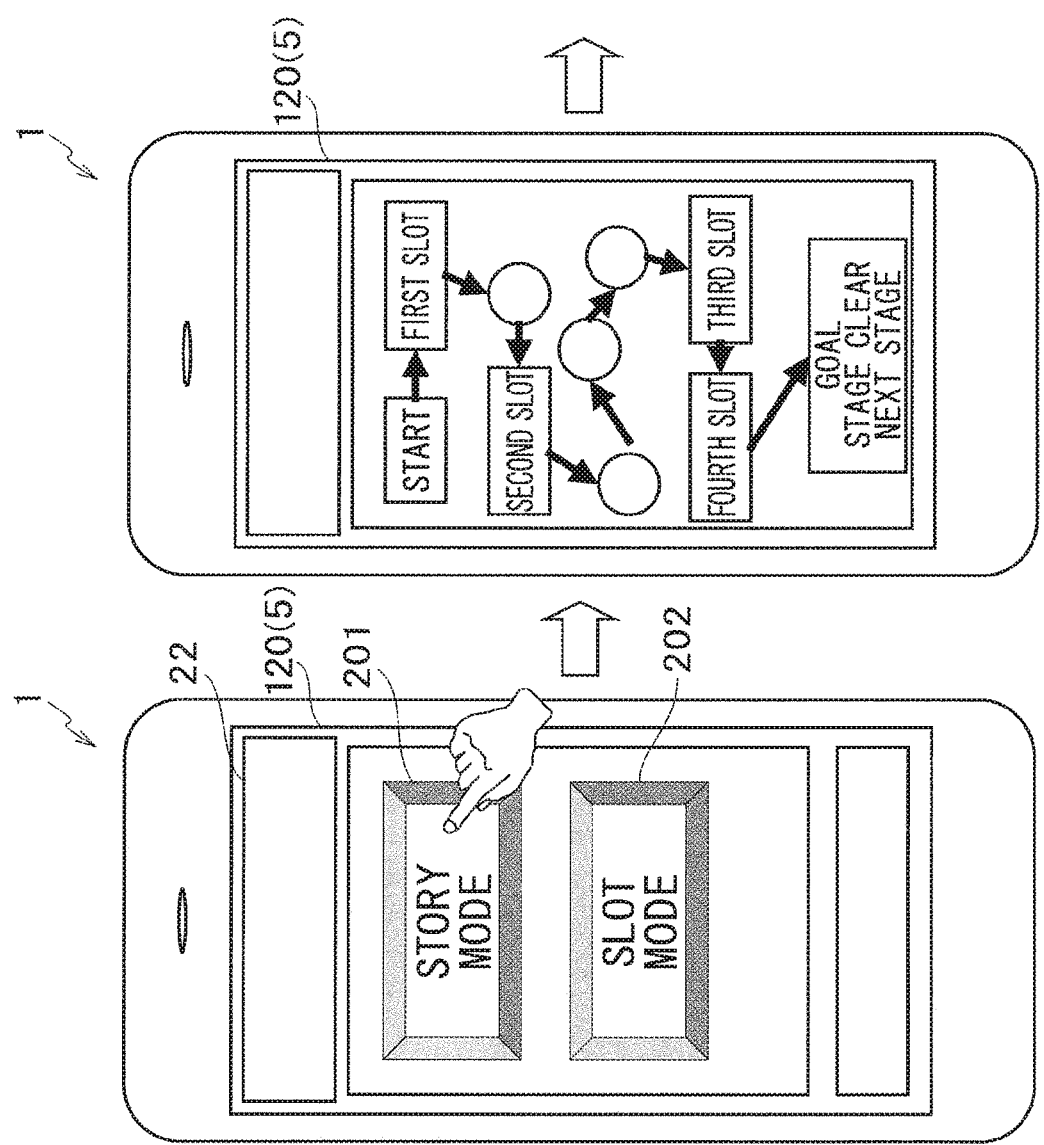
FIG. 11 is an illustrative view of game content displayed on a display.

When the application software of a game is executed in the smartphone 1, after various game start effect images and the like are displayed, as shown in FIG. 11, a selection image 201 of "story mode" and a selection image 202 of "slot mode" are displayed on the display 120.

Figure 12:
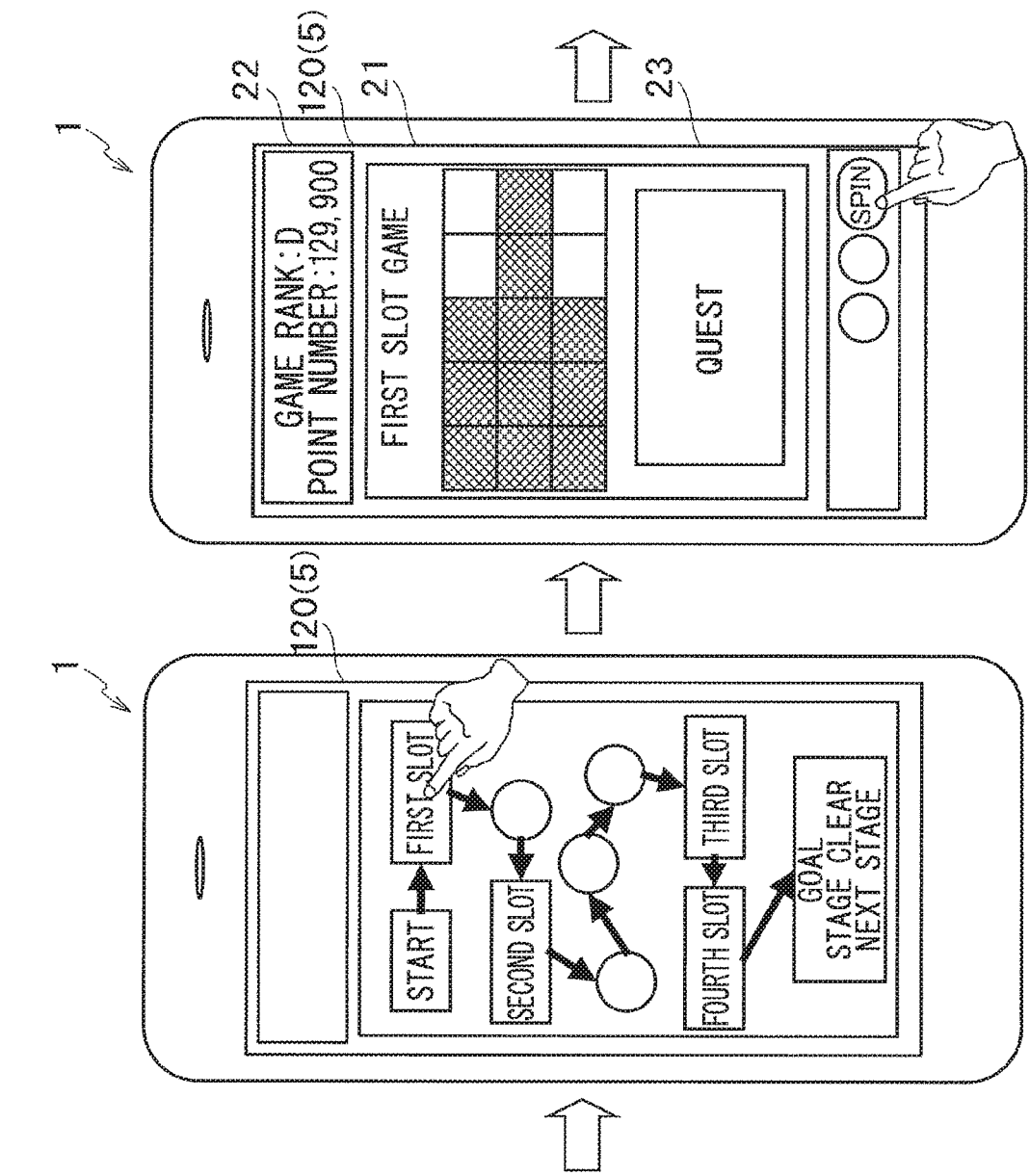
FIG. 12 is an illustrative view of game content displayed on a display.

Then, when the selection image 201 of "story mode" is selected by the touch panel 5, as shown in FIG. 11, every time the quest (a task to be cleared by satisfying a predetermined condition) is cleared from "start", a game of "story mode" aiming for a "goal" will be deployed by advancing a square (wherein, an item may be given due to the clearing of the quest). In this game of "story mode", as shown in FIG. 11, a square of "slot" ("first slot", "second slot", "third slot", "fourth slot") is provided in a predetermined square. When it stops or is selected in the square of this slot, various slot games are executed. For example, as shown in FIG. 12, when it stops or is selected in the square of the "first slot", a first slot game is executed in which a plurality of symbols are rearranged in a symbol display area 21 composed of 15 areas in a matrix of 3 rows×5 columns (details will be described later).

In addition, in the present embodiment, for the slot game executed in the "square" of each "slot" of the "first slot", "second slot", "third slot" and "fourth slot", the rule, payout manner, and effect image are different. For example, in the "third slot", a third slot game is executed in which a plurality of symbols are rearranged in a symbol display area composed of 9 areas in a matrix of 3 rows×3 columns (see FIG. 14). In the third slot game, a winning is determined by a combination of symbols rearranged on a payline (winning determination) set only in the middle of the symbol display area.

Figure 14:
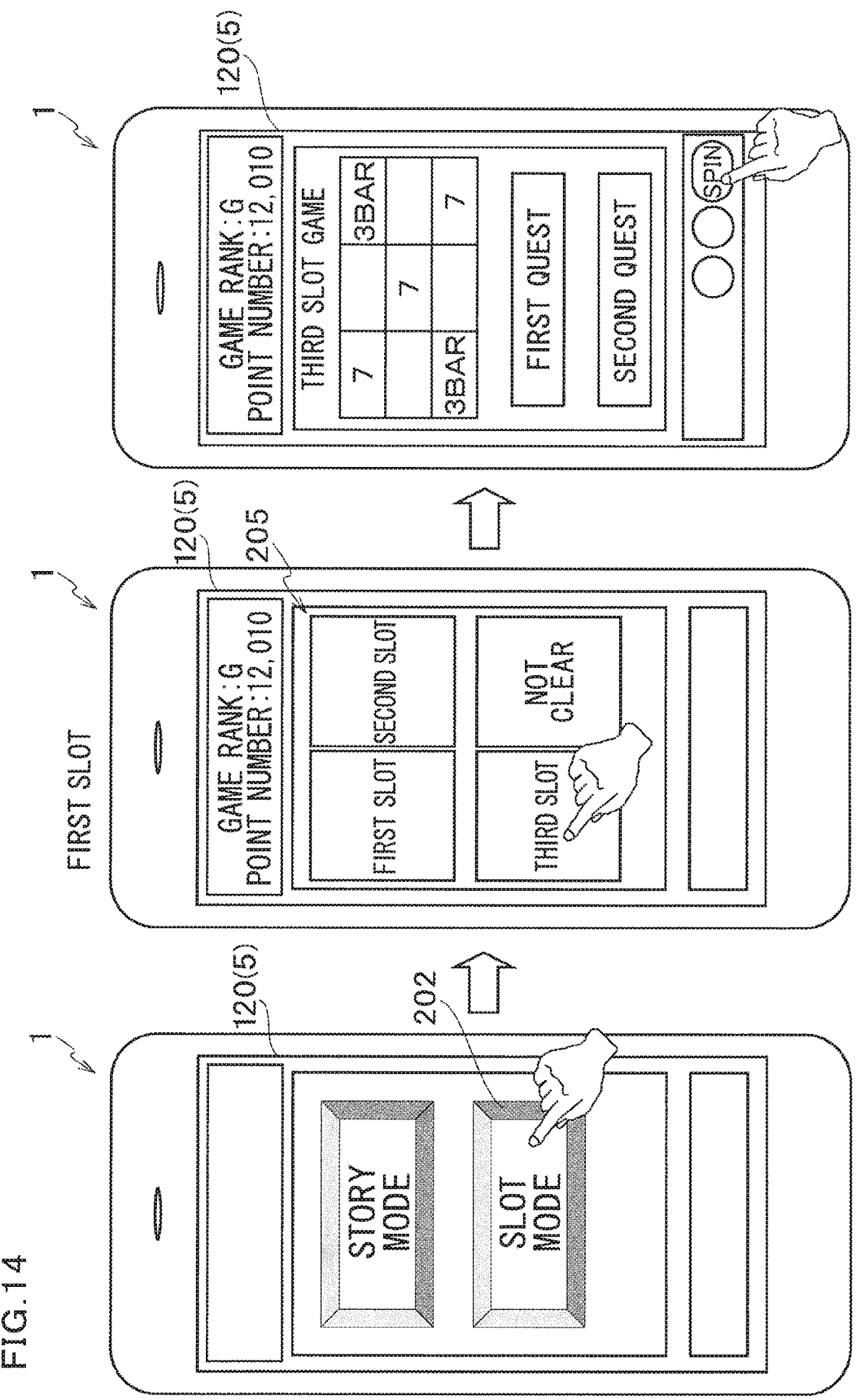
FIG. 14 is an illustrative view of game content displayed on a display.

On the other hand, as shown in FIG. 14, when the selection image 202 of "slot mode" displayed on the display 120 is selected by the touch panel 5, in the game of "story mode", a selection screen 205 of the cleared "slot" is displayed. The "slot" which is selectable on the selection screen 205 is a "slot" in which the quest (a task to be cleared by satisfying a predetermined condition) is cleared in the game of "story mode". For example, in the game of "story mode", when the quest of the slot game executed with the square of the "first slot", "second slot", and "third slot" is cleared, as shown in FIG. 14, the "first slot", "second slot", and "third slot" can be selected. In addition, in FIG. 14, since the quest of the fourth slot game executed with the square of "fourth slot" is not cleared, the "fourth slot" is not displayed on the selection screen 205 and can not be selected (displaying "NOT CLEAR").

Then, as shown in FIG. 14, when the "third slot" displayed on the selection screen 205 of the display 120 is selected by the touch panel 5, the third slot game is executed in which a plurality of symbols are rearranged in the symbol display area composed of 9 areas in a matrix of 3 rows×3 columns. In addition, the slot game executed in the "slot mode" is executed separately from the "story mode" and is selected when it is desired to enjoy pure slot game.

(Slot Game: Definitions)

Figure 1:
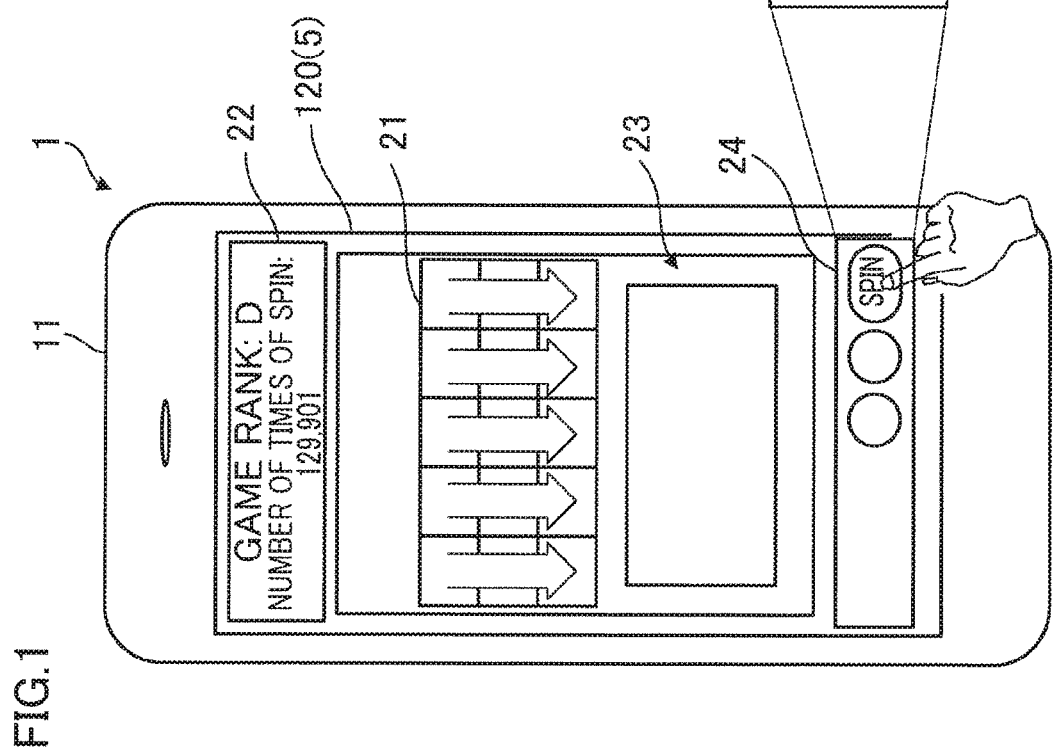
FIG. 1 is an illustrative view showing a display state of a smartphone (an information processor).

In the slot game executed in the present embodiment, a plurality of symbols are stopped and displayed (rearranged) in the symbol display area 21 after variation, and the benefit (such as the payout or item advantageous/disadvantageous to the player) is given by the combination of the symbols displayed in the symbol display area 21 (see FIG. 1). In addition, a state in which a plurality of symbols are stop-displayed after variation in the symbol display area 21 is referred to as "rearrangement". In the slot game, a normal game may be executed, and when a predetermined condition is satisfied in the normal game, a bonus game which is more advantageous to the player than the normal game may be executed.

A "gaming value" may be given in the benefit given by the game result based on the combination of the symbols displayed in the symbol display area 21. The "gaming value" in this case is a coin, a bill or an electronic valuable information (in-game currency) equivalent thereto. In addition, the "gaming value" is not particularly limited, and for example, when the slot game according to the present embodiment is executed by a gaming machine (slot machine) or the like installed in a hall or the like, it may be a gaming medium such as a medal, a token, an electronic money, a ticket, and the like. The ticket is not particularly limited, and a barcoded ticket may be adopted for example. Alternatively, the gaming value may be a game point not including valuable information.

The "unit game" is a series of operations from the start of the receiving of a bet to a state in which an award can be established. To put it differently, the unit game includes a single bet time for receiving a bet, a single game time of rearranging stopped symbols, and a single payout time of a payout process of awarding a payout.

(Slot Game Screen)

Next, the slot game screen displayed on the display 120 will be described. In the description of the slot game below, the first slot game will be described as an example.

As shown in FIG. 1, in the "story mode" or "slot mode", when the first slot game is executed, a slot game screen is displayed on the display 120. In the slot game screen, the symbol display area 21 composed of 15 areas in a matrix of 3 rows×5 columns, a game information display area 22 for displaying information increasing with the execution of the first slot game, an effect display area 23 for displaying a dynamic image such as a game character, a still image, and a message in accordance with the development of the slot game, and an operation display area 24 operated by the player for the progress of the first slot game are displayed. In the operation display area 24, a spin button 241, an AUTO button 242, an ITEM button 243, a bet button 244, and a WIN display unit 245 are displayed.

The touch panel 5 that transmits the slot game screen is provided on the entire surface of the display 120. The touch panel 5 makes it possible to detect the coordinate of the site touched by the player's finger or the like. Thus, for example, by pressing the image of the spin button 241, one first slot game (unit game) can be executed. In addition, by pressing the image of the AUTO button 242, the first slot game can be continuously performed. In addition, when the image of the ITEM button 243 is pressed, it is possible to select and use an item obtained in the previous "story mode" or "slot mode" by the player (which gives an advantage or a disadvantage to the player in the slot game).

(Symbol Display Area 21)

Figure 3:
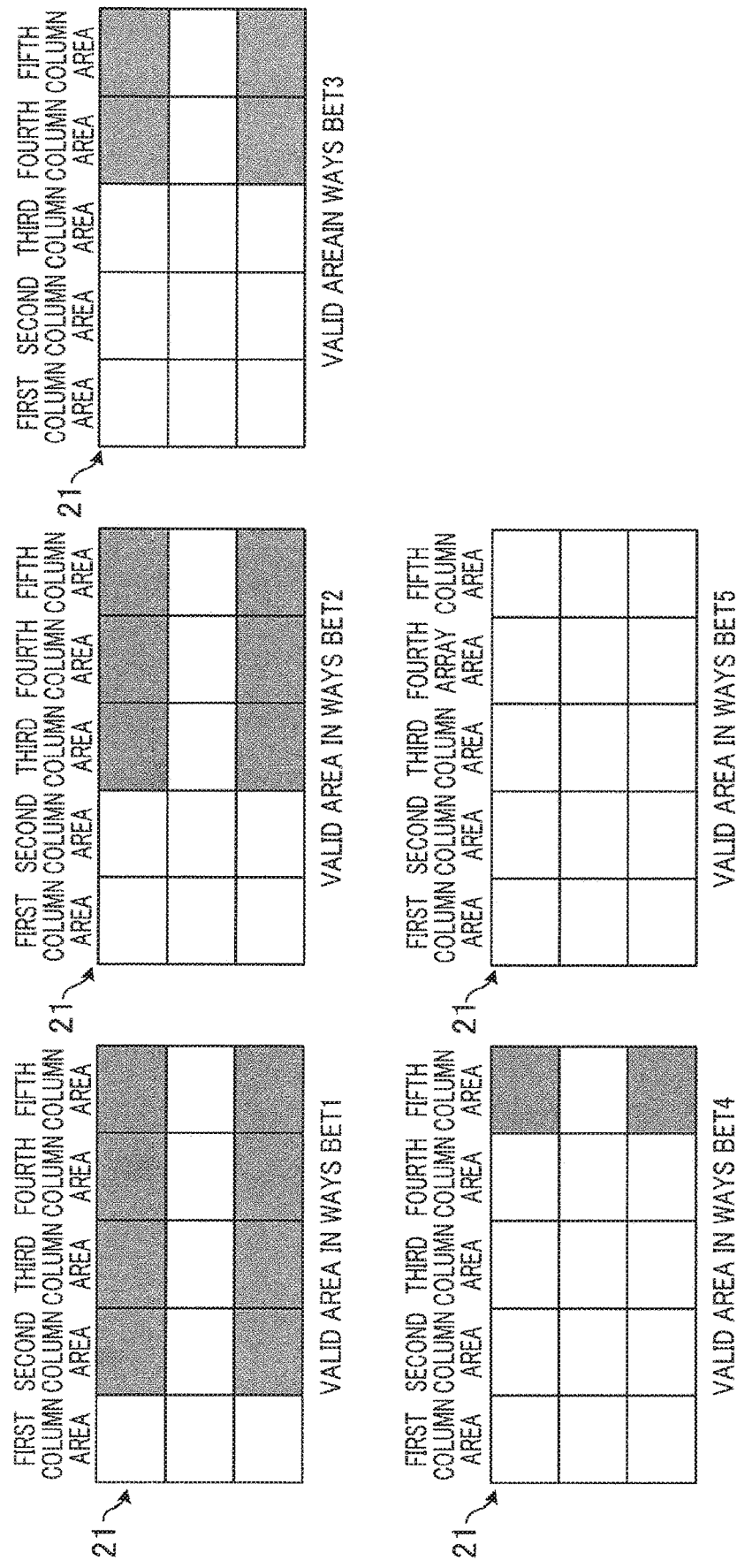
FIG. 3 is an illustrative view of an effective area of "WAYS BET" of a first slot game.
Figure 4:
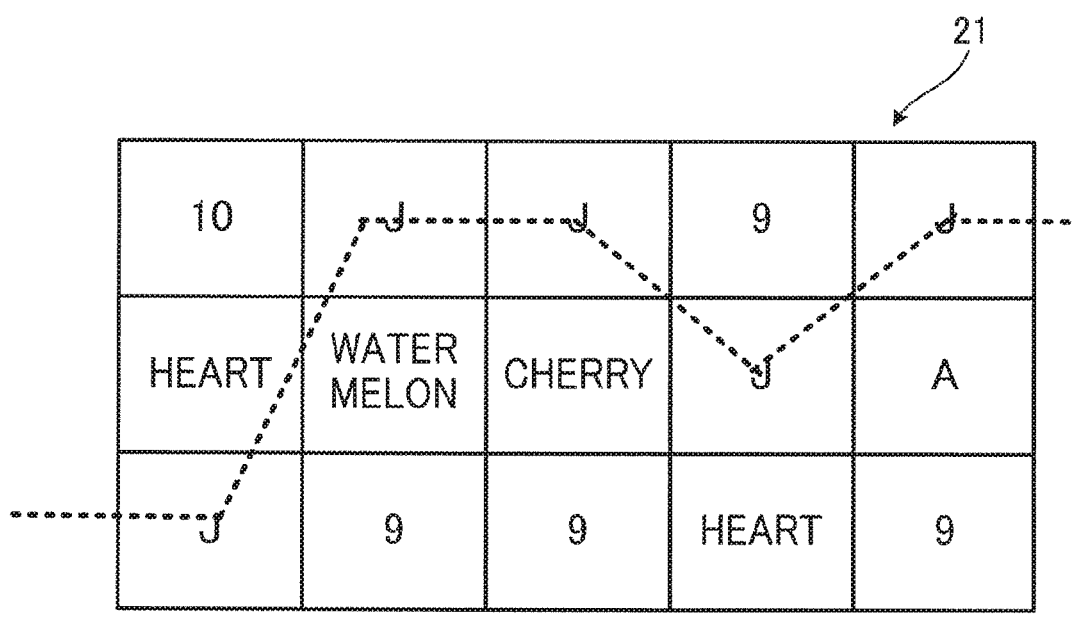
FIG. 4 is an illustrative view of a winning determination example in the "WAYS BET" of the first slot game.

As described above, in the symbol display area 21 of the first slot game, as shown in FIGS. 3 and 4, five column areas (the first column area to the fifth column area) each divided into three areas of an upper row, a middle row, and a lower row (three rows) are set. Also, video reels 3 (REEL 1, REEL 2, REEL 3, REEL 4, REEL 5) are displayed in the first to fifth column areas, respectively. In the video reels 3 of the first slot game of the present embodiment, operations of rotating and stopping mechanical reels on which a plurality of symbols are drawn on their circumferential surfaces are represented by images. Symbol columns composed of a plurality of symbols are allocated to the video reels 3 (REEL 1, REEL 2, REEL 3, REEL 4, REEL 5) (see FIG. 5).

In the symbol display area 21, the symbol columns allocated to the video reels 3 (REEL 1, REEL 2, REEL 3, REEL 4, REEL 5) are respectively scrolled and stopped after a lapse of a predetermined time. As a result, a part of each symbol array (three consecutive symbols in the first slot game) is sequentially displayed in the symbol display area 21. In the first to fifth column areas of the symbol display area 21, one symbol is allocated to each of the upper, middle, and lower areas is displayed accordingly to the video reels 3 (REEL 1, REEL 2, REEL 3, REEL 4, REEL 5). That is, in the symbol display area 21, 15 symbols of 5 columns×3 rows are displayed.

In the first slot game, the determination of winning adopts "LEFT TO RIGHT" type. First, the area as the object of the winning determination is determined from the 15 areas in 5 columns×3 rows of the symbol display area 21 by selecting five stages of the WAYS BET (WAYS BET 1, WAYS BET 2, WAYS BET 3, WAYS BET 4, WAYS BET 5) (determination of an valid area). Then, if symbols stopped in the area as the object of the winning determination are consecutively connected in a predetermined number from the first column area to the fifth column area, it becomes the winning (see FIG. 4).

Wherein, the selection of five stages of WAYS BET (WAYS BET 1, WAYS BET 2, WAYS BET 3, WAYS BET 4, WAYS BET 5) is performed by pressing the "+" button and "−" button (see FIG. 1) of the bet button 244. In addition, one credit is required to select WAYS BET 1. Also, three credits are required to select WAYS BET 2. Also, seven credits are required to select WAYS BET 3. Also, fifteen credits are required to select WAYS BET 4. Also, twenty-five credits are required to select WAYS BET 5.

More specifically, as shown in FIG. 3, when "WAYS BET 1" is selected, the upper row, the middle row, and the lower row of the first column area, the middle row of the second column area, the middle row of the third column area, the middle row of the fourth column area, and the middle row of the fifth column area of the symbol display area 21 become the object of the winning determination (valid). In addition, when "WAYS BET 2" is selected, the upper row, the middle row, and the lower row of the first column area, the upper row, the middle row and the lower row of the second column area, the middle row of the third column area, the middle row of the fourth column area, and the middle row of the fifth column area of the symbol display area 21 become the object of the winning determination (valid). In addition, when "WAYS BET 3" is selected, the upper row, the middle row, and the lower row of the first column area, the upper row, the middle row and the lower row of the second column area, the upper row, the middle row and the lower row of the third column area, the middle row of the fourth column area, and the middle row of the fifth column area of the symbol display area 21 become the object of the winning determination (valid). In addition, when "WAYS BET 4" is selected, the upper row, the middle row, and the lower row of the first column area, the upper row, the middle row and the lower row of the second column area, the upper row, the middle row and the lower row of the third column area, the upper row, the middle row and the lower row of the fourth column area, and the middle row of the fifth column area of the symbol display area 21 become the object of the winning determination (valid). In addition, when "WAYS BET 5" is selected, the upper row, the middle row and the lower row of the first column area, the upper row, the middle row and the lower row of the second column area, the upper row, the middle row and the lower row of the third column area, the upper row, the middle row and the lower row of the fourth column area, and the upper row, the middle row and the lower row of the fifth column area of the symbol display area 21 become the object of the winning determination (valid).

For example, as shown in FIG. 4, when the "WAYS BET 5" is selected, all areas of the symbol display area 21 become the objects of the winning determination (validated). Then, as shown in FIG. 4, when the symbols "J: Jack" are respectively stopped in the lower row of the first column area, the upper row of the second column area, the upper row of the third column area, the middle row of the fourth column area, the upper row of the fifth row column area, the symbols "J: Jack" are consecutively connected up to five from the first column area to the fifth column area ("LEFT TO RIGHT") to establish one winning. As described above, in the "LEFT TO RIGHT" type, even if the symbols are stopped in a wild disorder at a glance, if they are connected consecutively from the first column area to the fifth column area, the winning is determined. In addition, in the first slot game, the "LEFT TO RIGHT" type is adopted, but in other slot game, adopting a line type in which a line formed by connecting only the middle row of the column area of each column is a winning line is also possible. Further, a scatter type may be adopted for determining the winning according to the number of symbols of the same type displayed in the symbol display area 21.

(Symbol Columns of the Video Reels)

Next, with reference to FIG. 5, the configuration of the symbol array included in the video reels 3 of the first slot game will be described.

As shown in FIG. 5, symbol columns composed of the symbols corresponding to code numbers "0" to "33" are allocated to "Reel 1", "Reel 2", "Reel 3", "Reel 4", and "Reel 5" of the video reels 3, respectively. Normal symbols such as "7", "HEART", "BELL", "WATERMELON", "CHERRY", "ACE", "KING", "QUEEN", "JACK", "TEN", "NINE" and "WILD" symbol which is a universal symbol (symbol of almighty) as an alternate of another symbol are included in the types of symbols arranged in each symbol column of the video reels 3.

(Symbol Combination Table)

Next, with reference to 6, the symbol combination table is illustrated. FIG. 6 is an illustrative view of a symbol combination table used in the first slot game according to the present embodiment.

The symbol combination table of the first slot game defines the symbol combination (number of symbols) of symbols related to a winning (WIN) and the payout amount (payout). In the first slot game, the scrolling of the symbol column of the video reels 3 is stopped, and in an area of the symbol display area 21, which becomes the object of the winning determination by the WAYS BET described above, when a predetermined types of symbols are connected up to a predetermined number from the first column area to the fifth column area, the winning is established. Then, according to the winning, a benefit such as a payout is given to the player.

Basically, for each symbol of "7", "HEART", "BELL", "WATERMELON", "CHERRY", "ACE", "KING", "QUEEN", "JACK", "TEN", "NINE", when symbols of the same type are connected with each other up to 3 (3 Kind), 4 (4 Kind), or 5 (5 Kind) by the WAYS BET from the first column area to the fifth column area in the area which is the object of the winning determination, the winning is established. For the symbol of "WILD", it is substituted for each type of symbol of "7", "HEART", "BELL", "WATERMELON", "CHERRY", "ACE", "KING", "QUEEN", "JACK", "TEN", and "NINE".

For example, when "WAYS BET 3" is selected, the upper row, the middle row, and the lower row of the first column area, the upper row, the middle row and the lower row of the second column area, the upper row, the middle row and the lower row of the third column area, the middle row of the fourth column area, and the middle row of the fifth column area of the symbol display area 21 become the object of the winning determination (valid). Then, the scrolling of each symbol column of the video reels 3 (REEL 1, REEL 2, REEL 3, REEL 4, REEL 5) is stopped, and when the symbols "7" are respectively stopped in the lower row of the first column area, the upper row of the second column area, and the middle row of the third column area, the symbols "7" are connected with each other up to three from the first column area to the third column area ("LEFT TO RIGHT") to establish a winning ("3 Kind of "7" is established). In this case, referring to the symbol combination table of FIG. 6, "50" is determined as the payout amount. Then, a payout is given based on the determined payout amount.

In addition, in the first slot game, the required bet amount (WAYS BET 1: 1 credit, WAYS BET 2: 3 credits, WAYS BET 3: 7 credits, WAYS BET 4: 15 credits, WAYS BET 5: 25 credits) are determined in one selection of 5 stages of WAYS BET, respectively, but it is also possible to select WAYS BET more than once in the unit game. For example, when WAYS BET 3 (7 credits) is selected up to three times, 21 credits ("7"×"3"=21 credits) are required for the total bet amount, but when 3 Kind of "7" is established, "50"×"3"="150" is determined as the payout amount.

(Game Rank Correspondence Table)

Next, with reference to FIG. 7, the game rank correspondence table will be described. The game rank correspondence table is a table stored in the flash memory 104 and read out as necessary.

In the game rank correspondence table, the "Numerical Value Ranges of Points" (10 kinds), "Relaxation Rate of Quest", and 10 levels of "Game Rank" of "SSS", "SS", "S", "A", "B", "C", "D", "E", "F", "G" are associated with each other.

Specifically, the "numerical value range of points: 10,000 to 19,999" and "relaxation rate of quest: 2%" are associated with the "game rank G". The "numerical value range of points: 20,000 to 39,999" and "relaxation rate of quest: 4%" are associated with the "game rank F". The "numerical value range of points: 40,000 to 99,999" and "relaxation rate of quest: 6%" are associated with the "game rank E". The "numerical value range of points: 100,000 to 149,999" and "relaxation rate of quest: 8%" are associated with the "game rank D". The "numerical value range of points: 150,000 to 199,999" and "relaxation rate of quest: 10%" are associated with the "game rank C". The "numerical value range of points: 200,000 to 299,999" and "relaxation rate of quest: 12%" are associated with the "game rank B". The "numerical value range of points: 300,000 to 499,999" and "relaxation rate of quest: 14%" are associated with the "game rank A". The "numerical value range of points: 500,000 to 999,999" and "relaxation rate of quest: 16%" are associated with the "game rank S". The "numerical value range of points: 1,000,000 to 1,999,999" and "relaxation rate of quest: 18%" are associated with the "game rank SS". The "numerical value range of points: 2,000,000 to" and "relaxation rate of quest: 20%" are associated with the "game rank SSS".

Here, the "point" is a numerical value accumulated by counting the number of executions of the unit game when the first slot game is executed by the first slot in "story mode" or "slot mode" (obtained by digitizing and counting information which increases as the game is executed). The "numerical value range of points" is a numerical value range to which the accumulated points are referred. For example, when the first slot game has been executed for 12000 times in total by the first slot, the counted point is 12000 points, which is set to the "game rank G" corresponding to the "numerical value range of points: 10,000 to 19,999".

In addition, the "relaxation rate of quest" indicates the numerical relaxation rate of the condition to clear the quest in a game of "story mode". For example, normally, in order to clear a quest, when it is necessary to establish a winning of "J" for "100 times" in the first slot game, and when it is determined that the game rank of the current player is "D", the clear condition of the quest is relaxed by 8% (relaxation rate of quest: 8%), and only when the winning of "J" is established for "92 times", it will be able to clear the quest. In addition, in order to clear the quest, when it is necessary to acquire a payout of "10000" credits in total in the first slot game, and when it is determined that the game rank of the current player is "D", the clear condition of the quest is relaxed by 8%, and the quest can be cleared only if a payout of "9200" credits in total is acquired.

[Contents of Program]

Figure 8:
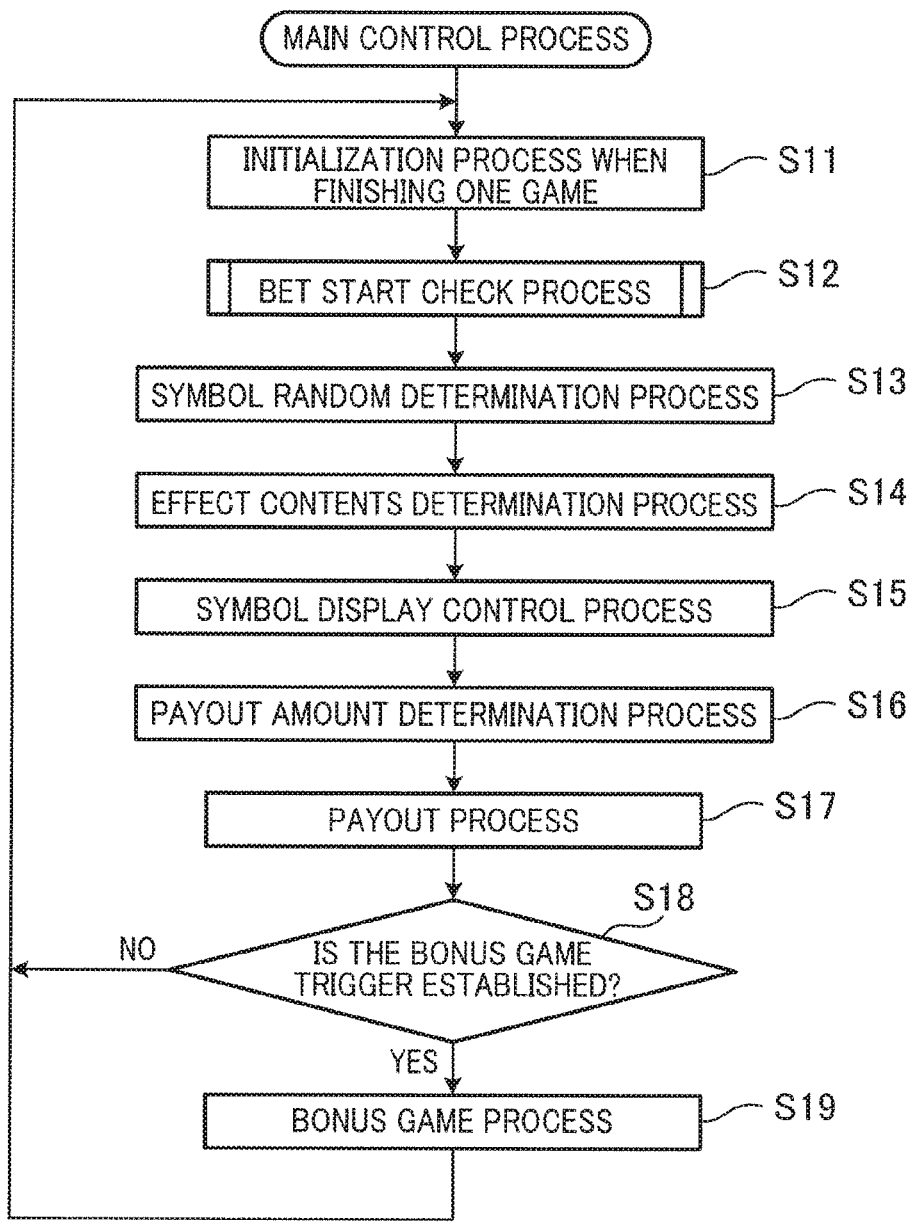
FIG. 8 is a flowchart showing a main control process.
Figure 9:
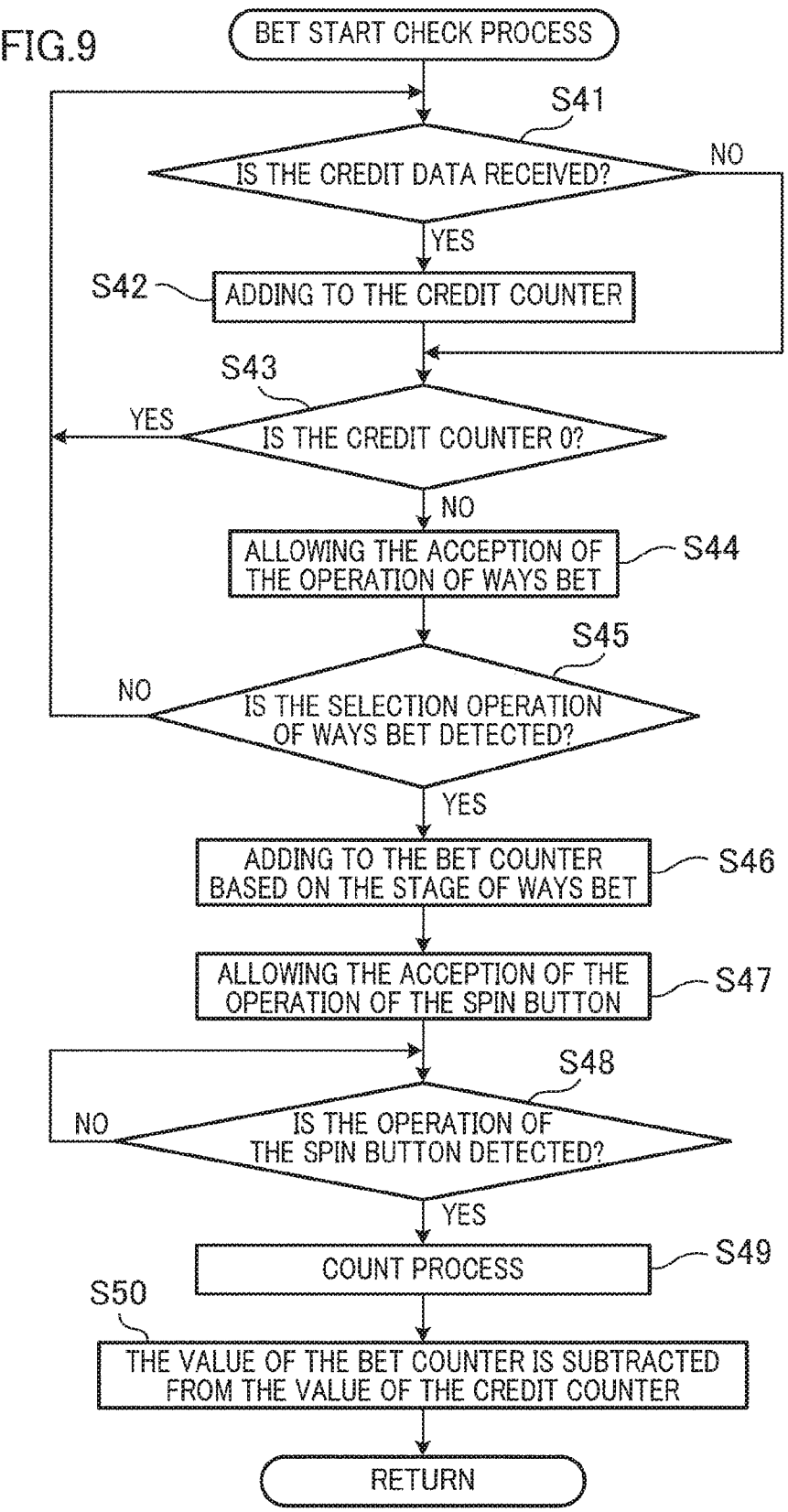
FIG. 9 is a flowchart showing a bet start check process.
Figure 10:
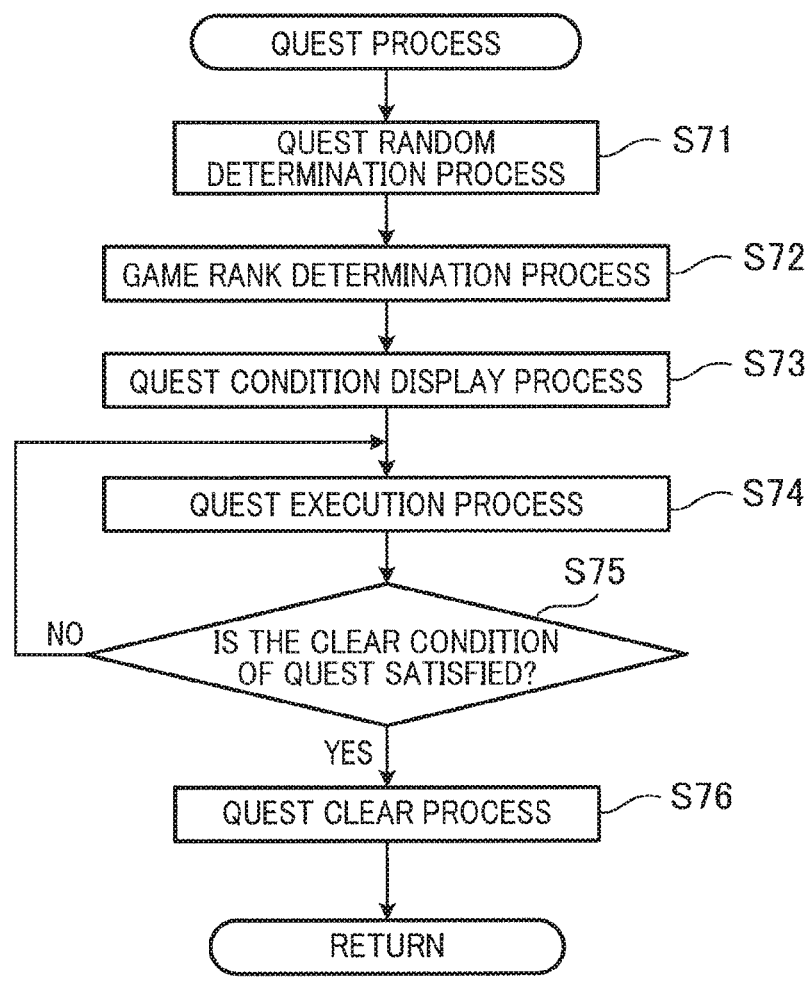
FIG. 10 is a diagram showing a flowchart of a quest process.

Next, a program of the first slot game executed by the smartphone 1 will be described with reference to FIG. 8 to FIG. 10.

(Main Control Process)

First, with reference to FIG. 8, the main control process will be described.

First, in order to start the first slot game, the CPU 101 performs an initialization process when finishing one game (S11). For example, unnecessary data for each unit game in the work area of the flash memory 104, such as the WAYS BET enabled in the previous unit game and the symbol determined to be displayed in the symbol display area 21 by the random determination is cleared.

Next, the CPU 101 performs a bet start check process to be described later (S12). In this process, an input check such as WAYS BET (WAYS BET 1, WAYS BET 2, WAYS BET 3, WAYS BET 4, WAYS BET 5) selected by the touch panel 5 or the like is performed.

Next, the CPU 71 performs a symbol random determination process (S13). In this symbol random determination process, the symbol column of the video reels 3 shown in FIG. 5 is used to determine a to-be-stopped symbol by the random determination from a plurality of symbols arranged in each symbol column (REEL 1, REEL 2, REEL 3, REEL 4, REEL 5) of the video reels 3. The to-be-stopped symbol is data of five symbols of the plurality of symbols constituting each symbol column to be displayed in the respective middle rows of the first to fifth row areas of the symbol display area 21. As a result, the 15 symbols displayed in the symbol display area 21 are determined.

For example, in the REEL 1 of the video reels 3, when a code number "7" is selected by the random determination from 26 symbols (code numbers "0" to "25") constituting the symbol column, the symbol of "HEART" corresponding to the code number "7" is determined as the to-be-stopped symbol (see FIG. 5). In addition, in the REEL 2, when a code number "9" is selected by the random determination from 29 symbols (code numbers "0" to "28") constituting the symbol column, the symbol of "WATERMELON" corresponding to the code number "9" is determined as the to-be-stopped symbol. In addition, in the REEL 3, when a code number "8" is selected by the random determination from 28 symbols (code numbers "0" to "27") constituting the symbol column, the symbol of "CHERRY" corresponding to the code number "8" is determined as the to-be-stopped symbol. In addition, in the REEL 4, when a code number "4" is selected by the random determination from 27 symbols (code numbers "0" to "26") constituting the symbol column, the symbol of "JACK" corresponding to the code number "4" is determined as the to-be-stopped symbol. In addition, in the REEL 5, when a code number "21" is selected by the random determination from 34 symbols (code numbers "0" to "33") constituting the symbol column, the symbol of "ACE" corresponding to the code number "4" is determined as the to-be-stopped symbol.

Then, the CPU 101 stores the five determined to-be-stopped symbols in the symbol storing area provided in the flash memory 104.

Next, the CPU 71 performs an effect contents determination process (S14). The CPU 101 extracts an effect-use random number and determines which one of a plurality of predetermined effect contents by the random determination.

Next, the CPU 101 performs a symbol display control process (S15). In the symbol display control process, the scrolling of each symbol column of the video reels 3 is started, and after a predetermined time, the five to-be-stopped symbols determined in the symbol random determination process in S13 are sequentially stopped respective middle rows of the first column area to the fifth column area of the symbol display area 21. That is, fifteen symbols including the to-be-stopped symbol are rearranged in the symbol display area 21. For example, as described above, in REEL 1, the symbol "HEART" is determined as a to-be-stopped symbol, in REEL 2, the symbol "WATERMELON" is determined as a to-be-stopped symbol, in REEL 3, the symbol "CHERRY" is determined as a to-be-stopped symbol, in REEL 4, the symbol "JACK" is determined as a to-be-stopped symbol, and in REEL 5, the symbol "ACE" is determined as a to-be-stopped symbol, and in this case, the "HEART", "WATERMELON", "CHERRY", "JACK", and "ACE" are respectively rearranged in respective middle rows of the first column area to the fifth column area of the symbol display area 21. In addition, symbols corresponding to preceding and succeeding code numbers of the to-be-stopped symbol are rearranged in the respective upper rows and the lower rows of the first to fifth column areas of the symbol display region 21 (with reference to FIG. 4).

Next, the CPU 101 performs a payout amount determination process (S16). In this process, based on the symbol combination table of the first slot games (with reference to FIG. 6) stored in the flash memory 104, it is determined whether symbols rearranged in the symbol display area 21 are connected up to the predetermined number from the first column area to the fifth column area in the area which is the object of the winning determination by the WAYS BET described above to establish a winning. Then, according to the winning, a benefit such as a payout is given. The given payout is stored in the payout amount storage area provided in the flash memory 104. For example, when the winning is a winning in which five symbols of "J: Jack" are connected (5Kind of "J"), with reference to the symbol combination table of FIG. 6, "100" credits are determined as a payout and stored in the payout amount storage area provided in the flash memory 104.

Next, a payout process is performed (S17). The CPU 101 adds the value stored in the payout amount storage area to the value of the credit number counter provided in the flash memory 104.

Then whether the bonus game trigger has been established is determined by the CPU 101 (S18). The trigger at the time of shifting to the bonus game in this embodiment is that four or more symbols of "7" are rearranged in the symbol display area 21 irrespective of the area validated by WAYS BET.

When it is determined that the bonus game trigger is established (S18: YES), the CPU 101 performs a bonus game process (S19). In the bonus game process according to the present embodiment, a mini game such as roulette or scratch is executed, and a payout is given according to the result thereof.

On the other hand, when it is determined that the bonus game trigger has not been established in the process of S18 (S18: NO), or after the process of S19, the CPU 101 turns to the process of S11.

(Bet Start Check Process)

Next, with reference to FIG. 9, the bet start check process will be described.

First, the CPU 101 determines whether or not credit data corresponding to the in-game currency has been received (S41).

When it is determined that the credit data has been received (S41: YES), the CPU 101 adds the amount indicated by the received credit data to the value of the credit number counter provided in the flash memory 104 (S42).

After S42 or when it is determined that the credit data is not received in S41 (S41: NO), the CPU 101 determines whether or not the value stored in the credit number counter is "0" (S43). When it is determined that the value stored in the credit number counter is "0" (S43: YES), the CPU 101 returns to the process of S41.

On the other hand, when it is determined that the value stored in the credit number counter is not "0" (S43: NO), the CPU 101 allows to accept the selection of the five stages of WAYS BET (WAYS BET 1, WAYS BET 2, WAYS BET 3, WAYS BET 4, WAYS BET 5) by pressing the touch panel 5 of the "+" button and the "−" button of the bet button 244 (with reference to FIG. 1) (S44). The area as the object of the winning determination is determined from the 15 areas in 5 columns×3 rows of the symbol display area 21 by selecting five stages of the WAYS BET (see FIG. 3).

Next, the CPU 101 determines whether or not a selection operation (pressing) of five stages of WAYS BET (WAYS BET 1, WAYS BET 2, WAYS BET 3, WAYS BET 4, WAYS BET 5) is detected (S45). If the selection operation of WAYS BET is not detected (S45: NO), turning to the process of S41.

On the other hand, when the selection operation of five stages of WAYS BET (WAYS BET 1, WAYS BET 2, WAYS BET 3, WAYS BET 4, WAYS BET 5) is detected (S45: YES), the CPU 101 adds the value of credits necessary for WAYS BET (1 credit if it is WAYS BET 1, 3 credits if WAYS BET 2, 7 credits if WAYS BET 3, 15 credits if WAYS BET 4, 25 credits if WAYS BET 5) to the value of the bet counter provided in the flash memory 104 (S46).

Next, after process of S46, the CPU 101 allow the acceptance of operation of the spin button 241 (S47).

After S47, the CPU 101 determines whether or not the operation of the spin button 241 is detected (S48). When the CPU 101 determines that the operation of the spin button 241 is not detected (S48: NO), waiting for the operation of the spin button 241.

On the other hand, when it is determined that the operation of the spin button 241 has been detected (S48: YES), the CPU 101 performs a count process (S49). In the count process, the point number "1" is incremented to the point counter provided in the counter area of the flash memory 104. For example, when the current point number is "129, 900" (with reference to FIG. 12), the point number "1" is incremented and the point number of the point counter is updated to "129, 901" (with reference to FIG. 13). That is, a process of digitizing and counting the number of executions of the game, which is information which increases as the game is executed, is performed in the counter area of the flash memory 104.

Wherein, the point number of the point counter is provided for each slot ("first slot", "second slot", "third slot", "fourth slot", etc.). Therefore, when the first slot game is executed, "1" is added to the point number of the point counter corresponding to the first slot. Likewise, when the second slot game is executed, "1" is added to the point number of the point counter corresponding to the second slot. In addition, when the third slot game is executed, "1" is added to the point number of the point counter corresponding to the third slot.

Here, in the present embodiment, the first slot game is executed in "story mode" and "slot mode". That is, the same first slot game is performed in two types of games. In this case, depending on the type of the game, the point number incremented to the point counter provided in the counter area of the flash memory 104 may be changed. That is, the conversion rate (the rate of giving points) for converting (digitizing) the number of executions of the game (information which increases as the game is executed) into a point may be changeable according to the type of the game. For example, in the first slot game executed in the "story mode", the point number incremented to the point counter every time the unit game is executed is set to "1" point, and in the first slot game executed in the "slot mode", the point number incremented to the point counter every time the unit game is executed is set to "2" points.

As described above, even if the information (the number of executions of the game) accompanying the execution of the first slot game is the same, depending on the type of game executed ("story mode" or "slot mode"), the conversion rate for converting the number of executions of the game into a point can be made different. As a result, the point to be counted can also be changed depending on the type of the game, so that the monotony with respect to the manner of giving the point to be counted can be improved. In addition, for a player, since the conversion rate when converting the number of executions of the game into a point varies depending on the type of game to be executed, there is a high possibility that it is possible to induce the play to execute the "slot mode" with a high conversion rate.

In addition, when it is determined that the operation of the spin button 241 is detected, the CPU 101 subtracts the value of the bet counter calculated in S46 from the value of the credit counter (S50). Thereafter, the bet start check process is terminated.

(Quest Process)

Next, in the game of "story mode", with respect to the process of quest as a clear condition of each slot game executed in the square such as "first slot", "second slot", "third slot" and the like, the first slot mode will be briefly described as an example.

For example, as shown in FIG. 12, when it stops or is selected in the square of the "first slot", a first slot game is executed in which a plurality of symbols are rearranged in a symbol display area 21 composed of 15 areas in a matrix of 3 rows×5 columns (the above main control process). Then, simultaneously with the first slot game (the above main control process), the quest process shown in FIG. 10 is executed.

In the quest process, first, the CPU 101 performs a quest random determination process (S71). In this quest random determination process, one quest is determined by random determination from a plurality of types of quests (tasks that are cleared by satisfying a predetermined condition). For example, in the case where "a quest in which the winning of "J" is established for 100 times in the first slot game" is determined by random determination, it is determined to repeat the first slot game, and if the winning of "J" is established for 100 times in total, it is determined that the quest is to be cleared (the winning of "J" may be any of 3Kind of "J", 4Kind of "J", and 5Kind of "J").

Next, the CPU 101 executes a game rank determination process (corresponding to a process of determining a game rank) (S72). In the game rank determining process, the point number of the point counter corresponding to the first slot game and the game rank correspondence table stored in the flash memory 104, which are provided in the counter area of the flash memory 104, are referred to, and the game rank corresponding to the point number of the point counter associated with the current first slot game is determined. For example, when the point number of the point counter corresponding to the first slot game is "129, 900" as a result of a total of 129,900 times of first slot games performed by the first slot, it corresponds to "game rank D" of "numerical value range of points: 100,000 to 149,999". As shown in FIG. 12, the game rank determined by the game rank determination process is displayed together with the point number of the point counter corresponding to the first slot game in the game information display area 22 of the display 120.

Next, based on the "alleviation rate of quest" corresponding to the game rank determined in the game rank determination processing of S72, the content of the quest determined in the quest random determination process of S71 is changed to a content of a quest of which the clear condition has been alleviated. That is, according to the game rank, a benefit of alleviating the clear condition of the quest is given. By doing this, it is possible to alleviate the clear condition of the quest by continuing the game, and to improve the monotony with respect to the clear manner of the quest. In addition, there is also a high possibility that it is possible to induce the player to execute the quest by continuing the game.

Figure 13:
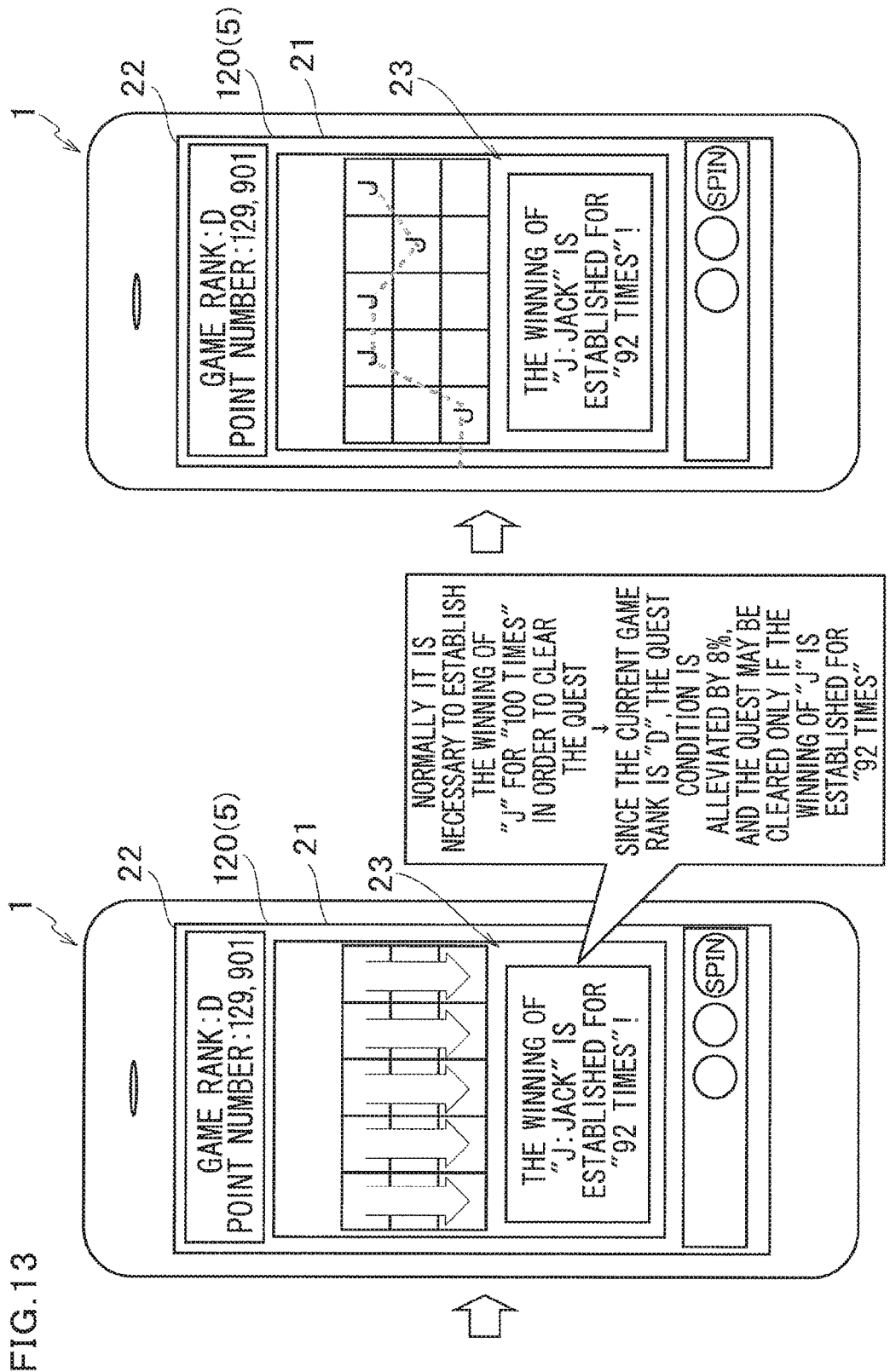
FIG. 13 is an illustrative view of game content displayed on a display.

Then, the content of the changed quest is displayed in the effect display area 23 of the display 120 (S73: quest condition display process). For example, in the case where "a quest in which the winning of "J" is established for 100 times in the first slot game" is determined by random determination, when it is the "game rank D" in which the "alleviation rate of quest" is "8%", the clear condition of quest is alleviated by "8%", and the quest can be cleared only if the winning of "J" is established for "92 times" ("100 times"ב100-8%"="92 times"). Then, as shown in FIG. 13, a message of "the winning of 'J: Jack' is established for '92 times'!" as the content of the changed quest is displayed in the effect display area 23 of the display 120.

Thereafter, the CPU 101 performs a quest execution process (S74). In this quest execution process, an operation or the like satisfying the clear condition of the quest is executed by executing the first slot game or the like by the player. For example, if it is possible to clear the quest by establishing the winning of "J" for "92 times", the number of winnings of "J" is counted by executing the first slot game. Wherein, the quest execution process is achieved by various processes corresponding to the quest content.

Next, the CPU 101 determines whether or not the clearing condition of the quest is satisfied (S75). When the clear condition of the quest is not satisfied (S75: NO), the process returns to S74. For example, if it is possible to clear the quest by establishing the winning of "J" for "92 times", when one winning of "J" is established by executing the first slot game, the clear condition of the quest is not satisfied (S75: NO) because it is necessary to establish the remaining 91 times of the winning of "J" (with reference to FIG. 13), and the process returns to the process of S74 and the first slot game is executed.

On the other hand, when it is determined that the clear condition of the quest is satisfied (S75: YES), the CPU 101 performs the quest clear process (S76). In this quest clear process, a benefit (a payout, an item) accompanying the quest clear is given to the player. In addition, when the quest of the first slot game is cleared, the "first slot" can be selected in "slot mode". Thereafter, this quest process is terminated.

By executing the slot game through the above processes, it is possible to digitize information (the number of executions of the game) which increases with the result or the like of the slot game (to convert it into a point), and a benefit (alleviation of the clear condition of the quest) corresponding to the counted numerical value (point) is given. According to this, if the slot game is continuously executed, a content of the benefit to be given also changes, so that it is possible to improve the monotony with respect to the manner of giving the benefit. In addition, for a player, since the benefit given by the continuation of the slot game changes, there is also a high possibility that it is possible to attract attention to the slot game and induce the player to continue the slot game.

Other Embodiments

In the above embodiments, in the "story mode" or "slot mode", when the first slot game is executed by the first slot, the point number is added to the point counter by counting the number of executions of the unit game; however, as information to be increased with the execution of the game, not only the number of executions of the unit game but also the credit amount betted, the credit amount acquired in the game, the number of times of use of items acquired in the game, access information provided once a day by accessing a server hosting the game may be used.

Although the embodiment of the present invention has been described above, it is merely a specific example, and the present invention is not particularly limited, and the specific configuration of each means and the like can be appropriately designed and changed. In addition, the effects described in the embodiments of the present invention are merely a list of the most preferable effects produced by the present invention, and the effects of the present invention are not limited to those described in the embodiments of the present invention.

What is claimed is:

1. An information-processing device that is programmed to execute a game, comprising:
    an input unit that is configured to receive user inputs to operate the game,
    a memory for storing a counter having a numerical value that increases as the game is repeatedly executed and a game rank correspondence table in which a plurality of numerical value ranges of the counter value and a plurality of game ranks are associated with each other, and
    a processor that is programmed to execute:
        (1a) a process of executing the game in accordance with user inputs received by the input unit, with the game including a plurality of stages in each of which different sub-games are executed and with availability of subsequent sub-games to be executed in a given stage requiring satisfaction of predetermined conditions through execution of preceding sub-stages in said given stage,
        (1b) a process of increasing the numerical value of the counter in the memory as the game is repeatedly executed,
        (1c) a process of determining a user's game rank based on the game rank correspondence table and the numerical value of the counter, and
        (1d) a process of giving a benefit according to the game rank, the benefit comprising alleviation of requirements necessary to satisfy the predetermined conditions required for one of the subsequent sub-games in said given stage to become available.

2. The information-processing device according to claim 1, wherein a rate at which the numerical value of the counter increases as the game is repeatedly executed varies in accordance with which of the different sub-games is being executed.

3. A method of controlling a game comprising the steps of:
    (1a) executing the game in accordance with user inputs received by an input unit, with the game including a plurality of stages in each of which different sub-games are executed and with availability of subsequent sub-games to be executed in a given stage requiring satisfaction of predetermined conditions through execution of preceding sub-games in said given stage,
    (1b) increasing a numerical value of a counter stored in a computer memory as the game is repeatedly executed,
    (1c) determining a user's game rank based on the numerical value of the counter and a game rank correspondence table stored in the computer memory, which game rank correspondence table has a plurality of numerical value ranges of the counter and a plurality of game ranks associated with each other, and (1d) giving a benefit according to the game rank, the benefit comprising alleviation of requirements necessary to satisfy the predetermined conditions required for one of the subsequent sub-games in said given stage to become available.

4. A non-transitory computer-readable medium storing a game program to be executed by a processor of an information-processing device, which game program, when executed by the processor, causes the processor to perform:

a process of executing a game in accordance with user inputs received by an input unit, with the game including a plurality of stages in each of which different sub-games are executed and with availability of subsequent sub-games to be executed in a given stage requiring satisfaction of predetermined conditions through execution of preceding sub-games in said given stage, a process of increasing a numerical value of a counter stored in a computer memory as the game is repeatedly executed, a process of determining a user's game rank based on the numerical value of the counter and a game rank correspondence table stored in the computer memory, which game rank correspondence table has a plurality of numerical value ranges of the counter and a plurality of game ranks associated with each other, and a process of giving a benefit according to the game rank, the benefit comprising alleviation of requirements necessary to satisfy the predetermined conditions required for one of the subsequent sub-games in said given stage to become available.

5. An information-processing device that is programmed to execute a game, the game being of a type that is one of a plurality of different game types, the information-processing device comprising:

an input unit that is configured to receive user inputs to operate the game, a memory for storing 1) a counter area for digitizing and counting information having a numerical value that increases as the game is repeatedly executed, and 2) a numerical-value game-rank correspondence table in which a plurality of ranges of the numerical value and a plurality of game ranks are associated with each other, and a processor that is programmed to execute:
(1a) a process of executing the game in accordance with user inputs received by the input unit,
(1b) a process of digitizing and counting said information which increases as the game is repeatedly executed and storing the numerical value thereof in the counter area, with a rate at which the information which increases as the game is repeatedly executed is counted, to determine the numerical value thereof, varies in accordance with the type of game that is being executed from among the plurality of different game types,
(1c) a process of determining a user's game rank corresponding to the numerical value stored in the counter area based on the numerical-value game-rank correspondence table, and
(1d) a process of giving a benefit according to the game rank.

6. The information-processing device according to claim 5, wherein a quest that is associated with the game and that is cleared by satisfying a predetermined condition is executed, and wherein the benefit given in the process (1d) comprises alleviation of the predetermined condition for clearing the quest in accordance with the user's game rank.

7. The information-processing device according to claim 6, wherein the information having a numerical value that increases as the game is repeatedly executed is a number of times the game is executed.

* * * * *